(12) United States Patent
Jang

(10) Patent No.: US 8,046,036 B2
(45) Date of Patent: Oct. 25, 2011

(54) SLIDE MODULE AND MOBILE TERMINAL HAVING THE SAME

(75) Inventor: Chang-Yong Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 301 days.

(21) Appl. No.: 12/372,532

(22) Filed: Feb. 17, 2009

(65) Prior Publication Data

US 2009/0245933 A1 Oct. 1, 2009

(30) Foreign Application Priority Data

Mar. 25, 2008 (KR) ........................ 10-2008-0027549

(51) Int. Cl.
*H04M 1/00* (2006.01)
(52) U.S. Cl. ............... 455/575.4; 455/575.1; 455/575.2; 455/575.3
(58) Field of Classification Search ..... 455/575.1–575.4
See application file for complete search history.

(56) References Cited

U.S. PATENT DOCUMENTS

| | | | |
|---|---|---|---|
| 7,385,150 B1 | 6/2008 | Siddiqui et al. | |
| 2006/0114646 A1 | 6/2006 | Koibuchi et al. | |
| 2007/0076861 A1* | 4/2007 | Ju | 379/433.01 |
| 2008/0058039 A1* | 3/2008 | Lee et al. | 455/575.4 |
| 2008/0161075 A1* | 7/2008 | Kim et al. | 455/575.4 |
| 2008/0254844 A1* | 10/2008 | Lee | 455/575.4 |
| 2009/0149228 A1* | 6/2009 | Wang et al. | 455/575.4 |

* cited by examiner

*Primary Examiner* — Charles Appiah
*Assistant Examiner* — Stamford Hwang
(74) *Attorney, Agent, or Firm* — Birch, Stewart, Kolasch & Birch, LLP

(57) ABSTRACT

A mobile terminal including a first body, a second body slidably moveable with respect to the first body such that the first body is moved between a closed position and an open position, a connector electrically connecting the first body to the second body, and a slide module connecting the first body to the second body to allow the second body to move with respect to the first body between the closed position and the open position is provided. The slide module includes a cover unit to prevent exposure of the connector when the first body is in the open position.

30 Claims, 15 Drawing Sheets

SLIDE MODULE AND MOBILE TERMINAL HAVING THE SAME

CROSS-REFERENCE TO RELATED APPLICATIONS

The present application claims priority to Korean Application No. 10-2008-0027549, filed on Mar. 25, 2008, the entire contents of which is hereby incorporated by reference in its entirety.

BACKGROUND OF THE INVENTION

1. Field of the Invention

The present invention relates generally to a slide module and mobile terminal having the same. More particularly, the present invention relates to a slide module with a cover unit for covering a connector so that the connector is not exposed in an open position, and a mobile terminal having the same.

2. Description of Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality that support game playing, while other terminals are configured as multimedia players. More recently, mobile terminals have been configured to receive broadcast and multicast signals that permit viewing of content such as videos and television programs.

Efforts are ongoing to support and increase the functionality of mobile terminals. Such efforts include software and hardware improvements. For example, a user interface environment is provided to allow users to easily and conveniently search for and/or select functions. Also, because users consider their mobile terminal to be a personal portable device that can express their personality, many different designs for mobile terminals have been developed. For example, mobile terminals come in many different types such as folder types, slide types, swivel types, and the like.

Of the various types of mobile terminals, the slide type mobile terminal is configured such that first and second bodies move relative to each other between a closed position in which the first and second bodies are disposed to overlap with each other and in an open position in which at least a portion between the first and second bodies is exposed.

A connector is arranged where the first and second bodies overlap each other in the open position. As the relative movement distance of the first and second bodies increases, a space where the connector may be disposed is reduced, and if the relative movement distance of the first and second bodies increases by more than a certain distance, a portion of the connector becomes exposed, thereby degrading the aesthetics of the mobile terminal and subjecting the connector to the environment.

BRIEF SUMMARY OF THE INVENTION

Accordingly, one aspect of the present invention is to address the above-noted problems and other problems, including increasing a relative movement distance of first and second bodies without degrading the aesthetics of the mobile terminal by preventing a connector from being exposed when the first body is moved into the open position.

To achieve these and other advantages and in accordance with the purpose of the present invention, as embodied and broadly described herein, the present invention provides in one aspect a mobile terminal including a first body, a second body slidably moveable with respect to the first body such that the first body is moved between a closed position and an open position, a connector electrically connecting the first body to the second body, and a slide module connecting the first body to the second body to allow the second body to move with respect to the first body between the closed position and the open position. The slide module includes a cover unit to prevent exposure of the connector when the first body is in the open position.

To achieve these and other advantages and in accordance with the purpose of the present invention, as embodied and broadly described herein, the present invention provides in another aspect a slide module slide module for a mobile terminal having a first body, a second body slidably connected to the first body such that the first body is moveable between a closed position and an open position, and a connector electrically connecting the first body to the second body. The slide module includes a first slide member connectable to the first body, the first slide member having a connector hole capable of receiving a portion of the connector when the first body is in the closed position, a second slide member connectable to the second body, the first slide body being slidably connected to the second slide body to allow the first and second bodies to move between the closed and open position, and a cover unit configured to prevent exposure of the connector when the first body is in the open position.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 8A to 8C are front views of the slide module of FIG. 7;

DETAILED DESCRIPTION OF THE INVENTION

A slide module and a mobile terminal having the same according to exemplary embodiments of the present invention will now be described in detail with reference to the accompanying drawings.

Figure 1:
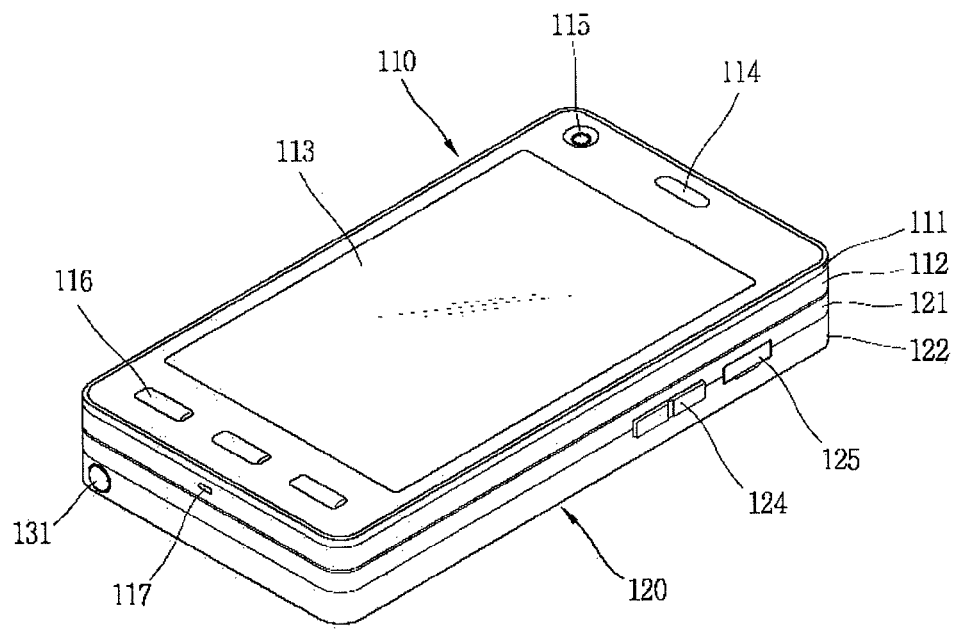
FIG. 1 is a front perspective view of the mobile terminal according to an exemplary embodiment of the present invention in an closed position.
Figure 2:
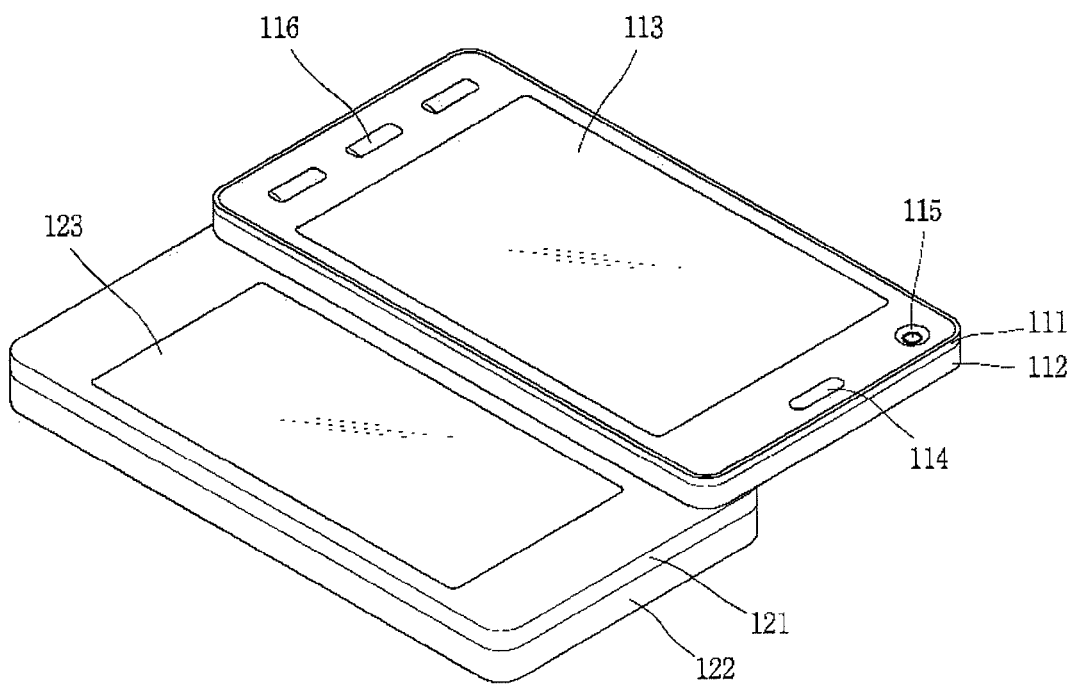
FIG. 2 is a front perspective view of the mobile terminal of FIG. 1 in an open position.

FIGS. 1 and 2 are front perspective views of a mobile terminal according to an exemplary embodiment of the present invention. The mobile terminal according to an embodiment of the present invention includes a first body 110, and a second body 120 that is slidably moved along at least one direction with respect to the first body 110.

A state in which the first terminal body 110 is disposed to overlap with the second terminal body 120, as shown in FIG. 1, may be called a closed configuration where the first body is in a closed position, and a state in which at least a portion between the first and second bodies 110 and 120 is exposed, as shown in FIG. 2, may be called an open configuration where the first body is in an open position. As shown in FIG. 2, the first and second bodies 110 and 120 may be configured to be slidably moved in a direction perpendicular to the lengthwise direction of the first and second bodies 110 and 120.

A case, which may also be referred to as a housing, a casing, a cover, or the like, defining the external appearance of the first body 110 includes a front case 111 and a rear case 112. Various electronic components may be installed in a space formed by the front case 111 and the case 112. At least one intermediate case (not shown) may be disposed between the front case 111 and the rear case 112 to further divide the space between the front case 111 and the rear case 112. The case can be formed by injection-molding a synthetic resin, or made of a metallic material such as stainless steel (STS), titanium (Ti), or the like.

On the first body 110, specifically, on the front case 111, there may be disposed a first display unit 113, a first audio output unit 114, a first image input unit 115, a first manipulation unit 116, and an audio input unit 117 (See FIG. 1). The display unit 113 may include a Liquid Crystal Display (LCD) module, an Organic Light Emitting Diode (OLED) module, or the like. Further, the display unit 113 may include a touch screen that allows inputting of information by user's touching. The first audio output unit 114 may be implemented in the form of a receiver or a speaker, and the first image input unit 115 may be implemented in the form of a camera module for capturing an image or video of a user or another subject. The first manipulating unit 116 may receive a command for controlling an operation of the mobile terminal according to an exemplary embodiment of the present invention, and the audio input unit 117 may be implemented in the form of, for example, a microphone to receive user's voice or other sounds.

Like the first body 110, the case of the second body may include a front case 121 and a rear case 122. A second display unit 123 may be disposed on the second body 120, specifically, on a front surface of the front case 121. The second display unit 123 may be implemented in the form of a touch screen, and information inputted to the second display unit 123 may be displayed on the first display unit 113. For example, visual information in the form of a QWERTY keypad may be outputted to the second display unit 123, and when key input information such as a character, a number, a symbol, or the like is inputted, the same can be displayed on the first display unit 113. A second manipulating unit 124 and an interface 125 may be disposed on at least one of the front case 121 and the rear case 122.

The first and second manipulating units 116 and 124 may be any conventional inputting devices so long as they allow a user to perform manipulation in a tactile manner. For example, the first and second manipulating units 116 and 124 may be implemented as a dome switch or a touch pad that receives a command or information according to a push or touch manipulation by the user. Similarly, the first and second manipulating units may be implemented in a manner to be manipulated by other movements such as a wheel for rotating a key, a jog type, a joystick, or the like.

In terms of function, the first manipulating unit 116 may be operated to input a command such as start, end, scroll, etc., and the second manipulating unit 124 may operate as a hot key for performing a particular function such as activation of the first image input unit 115.

The interface 125 serves as a path for allowing the mobile terminal to exchange data with an external device. For example, the interface 125 may be implemented as one of a connection port (terminal) for connecting an ear phone to the mobile terminal via a fixed or wireless means, a an IrDA port, a BLUETOOTH port, a wireless LAN port, or a power supply port that supplies power to the mobile terminal, or the like. The interface 125 may be a card socket (or receiving unit) for accommodating an external card, such as a Subscriber Identity Module (SIM), a User Identity Module (UIM), a memory card for storing information, or the like.

Figure 3:
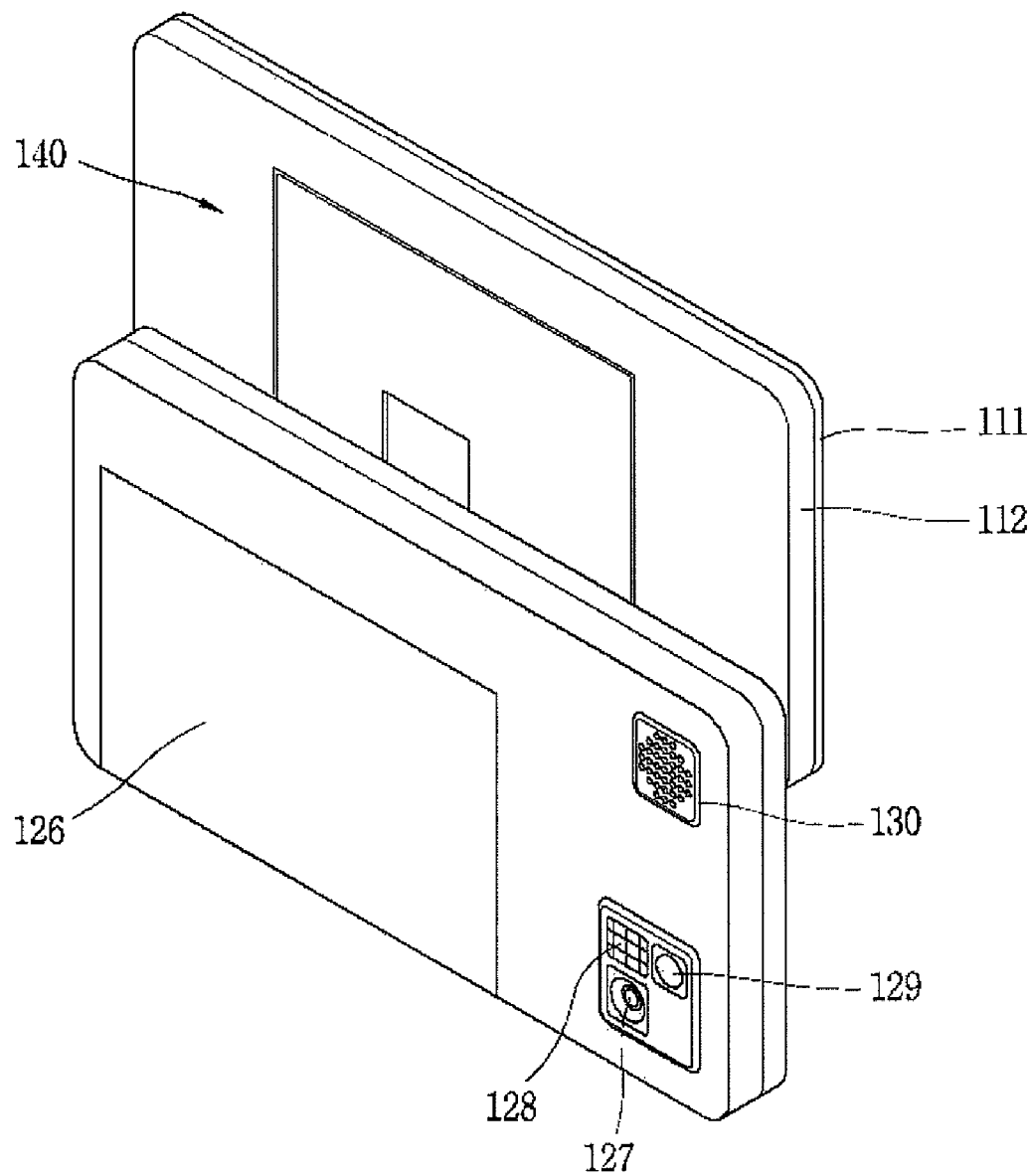
FIG. 3 is a rear perspective view of the mobile terminal of FIG. 1.

FIG. 3 is a rear perspective view of the mobile terminal according to an embodiment of the present invention. With reference to FIG. 3, a power supply unit 126 for supplying power to the mobile terminal is mounted at the rear case 122 of the second body 120. The power supply unit 126 may be detachably combined to perform re-charging as a rechargeable battery.

As also shown in FIG. 3, a second image input unit 127 may be located ate the rear case 122 of the second body 120. The second image input unit 127 may have an image capture direction that is substantially the opposite to that of the first image input unit 115 (See FIG. 1), and may be a camera supporting a different number of pixels from that of the first image input unit 115. For example, the first image input unit 115 may be used for low resolution (i.e., supporting a relatively small number of pixels) to quickly capture an image (or video) of the user's face and immediately transmit the same to the other party during video conferencing or the like. Meanwhile, the second image input unit 127 may be used for high resolution (i.e., supporting a relatively large number of pixels) in order to capture more detailed (higher quality) images (or video) which typically do not need to be transmitted immediately.

A flash 128 and a mirror unit 129 are disposed to be adjacent to the second image input unit 127. The flash 128 provides light to a subject when an image of the subject is being captured by the second image input unit 128. The mirror unit 129 allows the user to see himself when he wants to capture his own image (self-image capturing) by using the second image input unit 127.

A second audio output unit 130 may be additionally disposed on the rear case 122. The second audio output unit 130 may implemented a stereophonic function in conjunction with the first audio output unit (114 in FIG. 1), or may be used for a call in a speaker phone mode.

In addition to an antenna for receiving and transmitting a call, a broadcast signal reception antenna (131 in FIG. 1) may be disposed at one side of the first body 110 or second body 120. The antenna 131 may be installed to be protractible from the second body 120.

While various components, including the second image input unit 127, have been described as being part of the second body 120, the present invention is not so limited. For example, one or more of the components (e.g., 127 to 130), which are described as being disposed on the rear case 122, may be disposed on the first body 110, particularly, on the rear case 112. If the mobile terminal is so modified, those elements disposed on the rear case 112 can be protected (or covered) by the second body 120 in the closed position. In addition, even if the second image input unit 127 is not provided, the first image input unit 115 may be configured to rotate (or otherwise be moved) to allow image capturing in various directions.

A portion of a slide module 140 for slidably coupling the first body 110 and the second body 120 is disposed at the rear case 112 of the first body 110. The construction of the slide module 140 according to a first exemplary embodiment will now be described in detail with reference to FIGS. 4, 5, and 6A to 6C.

Figure 4:
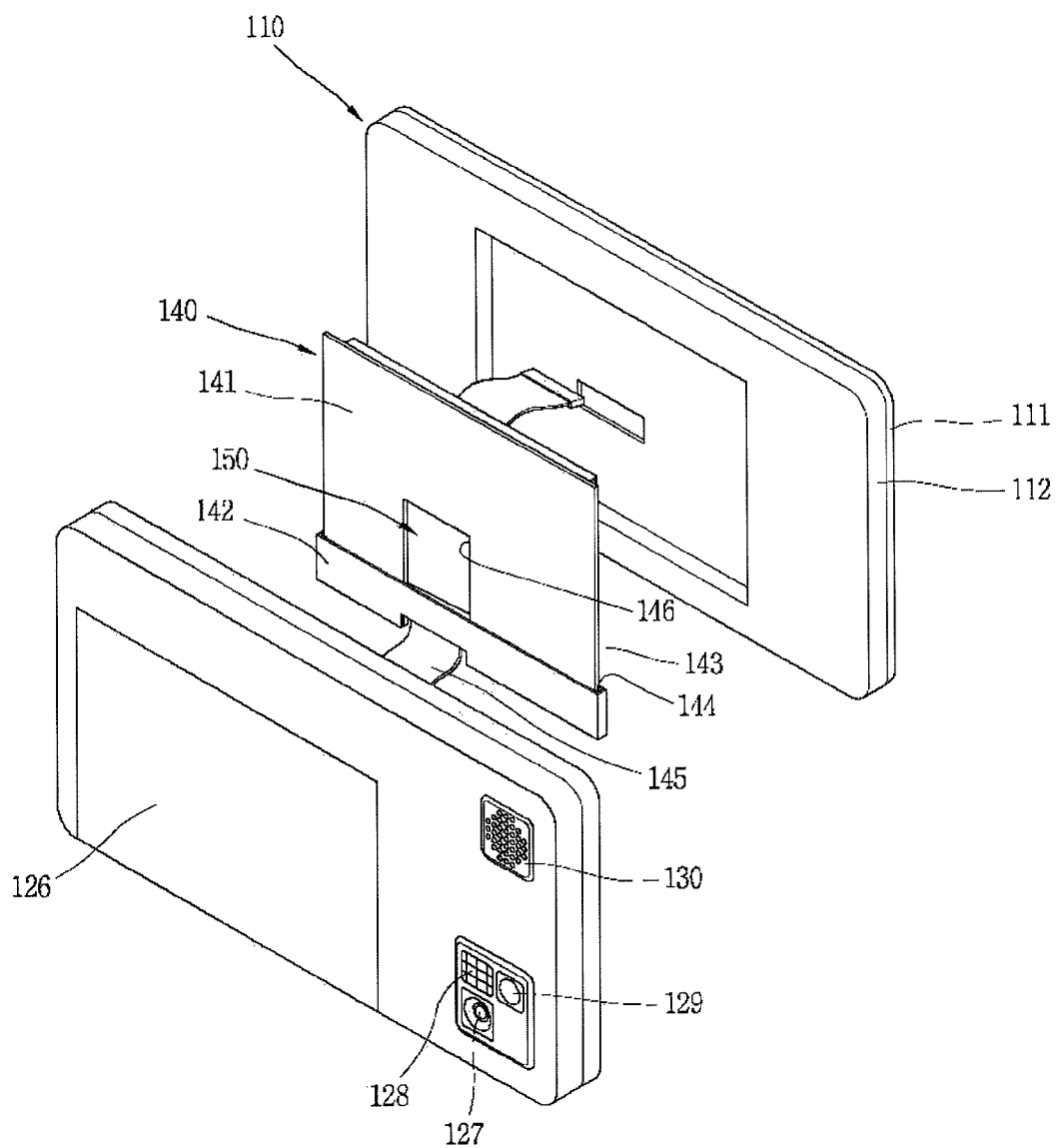
FIG. 4 is an exploded perspective view of the mobile terminal of FIG. 3.

FIG. 4 is an exploded perspective view of the mobile terminal in FIG. 3, showing the construction of the slide module 140. The slide module 140 includes a first slide member 141 fixed to the first body 110 and a second slide member 142 fixed to the second body 120. The first and second slide members 141 and 142 are slidably coupled. In this exemplary embodiment, the first slide member 141 is configured to have a larger area than the second slide member 142. A slide rail 143 is formed at an edge of the first slide member 141, and a slide groove 144 may be formed on the second slide member such that the slide groove 144 extends toward the first body 110 to cover the slide rail 143.

The first and second bodies 110 and 120 may be electrically connected by a connector 145, and an FPCB (Flexible Printed Circuit Board) that can be deformable according to a relative movement of the first and second bodies 110 and 120 may be, for example, used as the connector 145. The connector 145 connects the first and the second bodies 110 and 120 by penetrating at least one of the first and second slide members 141 and 142. For example, the first slide member 141 may include a connector hole 146 to allow the connector 145 to penetrate therethrough. Particularly, one end of the connector 145 is connected to the first body 110, and the other end of the connector 145 is connected to the second body by passing through the connector hole 146. In this configuration, the connector hole 146 receives a portion of the connector 145 in a first state (i.e., closed position), and guides the movement of the connector 145 when the first and second slide members 141 and 142 are moved relative to each other.

When the first and second bodies 110 and 120 are in the open position, as shown in FIGS. 3 and 4, a portion of the connector 145 would normally be exposed via the connector hole 146 of the first slide member 141 except that the slide module 140 according to the present invention includes a cover unit 150 to cover the connector 145 in the open position to prevent the connector 145 from being exposed in the open position. The cover unit 150 is connected to the first and second slide members 141 and 142 to open and close the connector hole 146 according to a relative movement of the first and second slide members 141 and 142.

Figure 5:
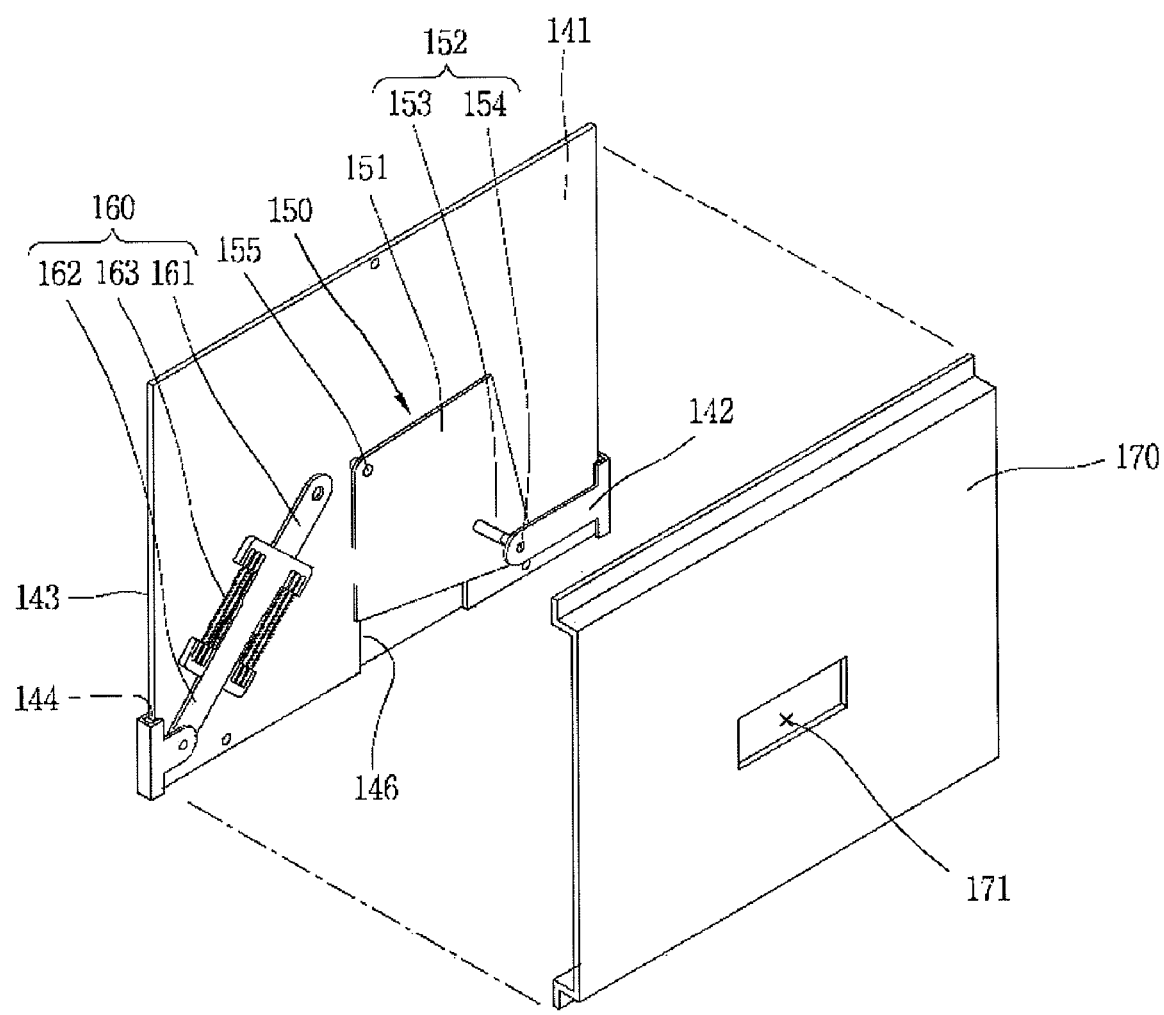
FIG. 5 is a perspective view of a slide module according to a first exemplary embodiment of the present invention.

The construction and operation of the cover unit 150 will now be described in detail. FIG. 5 is a perspective view of the slide module 140 according to the first exemplary embodiment of the present invention and is viewed from the first body 110 toward the second body 120. The cover unit 150 includes a cover body unit 151 connected to the first slide member 141, and a link unit 152 connected to the second slide member 142.

One end of the cover body unit 151 is rotatably connected to the first slide member by means of a first rotation point 155, and the cover body unit 151 is configured to uncover and cover the connector hole 146 according to a rotational operation. The cover body unit 151 may be formed in the form of a plate, and may be rotatably connected to the first slide member 141 by means of the first rotation point 155 at a region adjacent to the connector hole 146.

The link unit 152 connects the cover body unit 151 to the second slide member 142, and rotates the cover body unit 151 about the first rotation point 155 according to a relative movement of the first and second slide members 141 and 142. The link unit 152 includes a hole 153 formed in the cover body unit 151 and a second rotation point 154 rotatably connecting the cover body unit 151 to the second slide member 142. The hole 153 is formed in the form of a slit or groove extending in a direction from the second rotation point 154 to the first rotation point 155, and the second rotation point 154 is configured to be linearly moved along the hole 153.

The cover body unit 151 and the link unit 152 are provided at a front surface of the first slide member 141, particularly, between the first slide member 141 and the first body 110, so that the cover body unit 151 and the link unit 142 are not be exposed when the first and second bodies 110 and 120 and the slide module 140 are combined.

The slide module 140 may further include an elasticity providing unit 160 to apply elastic force to the first and second slide members 141 and 142 to assist in moving the first and second bodies 110 and 120 between the closed position and the open position according to the relative movement of the first and second slide members 141 and 142. The elasticity providing unit 160 may be disposed between the first slide member 141 and the first body 110 so as not to be exposed in the open position, and may be disposed on the same plane on which the cover unit 150 is positioned. In addition, the elasticity providing unit 160 is disposed between the front surface of the first slide member 141 and an inner surface of the slide groove 144 to connect the first and second slide members 141 and 142. In the present exemplary embodiment, if the cover unit 150 is mounted at one side based on a central region of the first slide member 141, the elasticity providing unit 160 may be mounted on the other side of the first slide member 141. In other words, the cover unit 150 and elasticity providing unit 160 are provided at opposite sides of the first slide member 141 on the front surface thereof.

The elasticity providing unit 160 includes a first rod 161 with one end rotatably connected to the first slide member 141, a second rod 162 with one end rotatably connected to the second slide member 142, the second rod 162 being linearly movable on the first rod 161, and a spring 163 mounted between the other end of the first rod 1651 and the other end of the second rod 162 to generate elastic force between the first and second rods 161 and 162. In this exemplary embodiment, one end of the first rod 161 is connected to the front surface of the first slide member 141, and one end of the second rod 162 is connected to an inner surface of the slide groove 144 formed at the second slide member 142.

The first slide member 141 may further include a cover member 170 that covers the cover unit 150 and the elasticity providing unit 160. The cover member 170, which serves to fasten the first body (110 in FIG. 4) to the first slide member 141 and prevents an interference between the elasticity providing unit 160 and the first body 110, has a plate form with both ends bent toward the first slide member 141. A through hole 171 is formed on the cover member 170 to allow the connector 145 to penetrate therethrough.

Figure 6A:
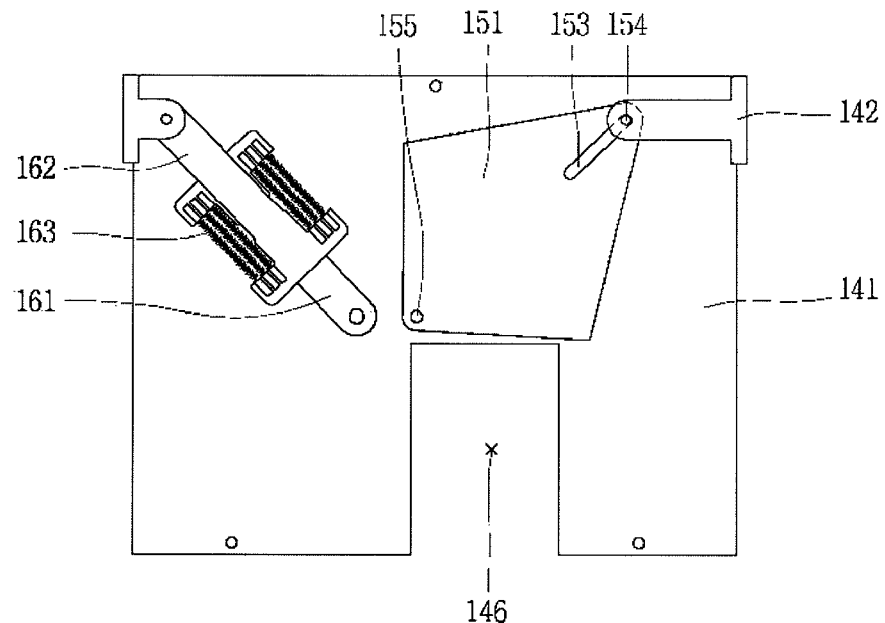
FIGS. 6A to 6C are front views of the slide module of FIG. 5.

Having described the first exemplary embodiment of the slide module 140, movement of the components of the slide module 140 when the first body 110 is moved between the closed and open positions will be described with reference to FIGS. 6A to 6C. With reference to FIG. 6A, in the closed position, the second slide member 142 is positioned at an upper region of the first slide member 141. In the closed position, the cover body unit 151 is positioned at an upper side of the connector hole 146 in a state that the connector hole 146 is open. The first and second rods 161 and 162 of the elasticity providing unit 160 are disposed to be spaced apart, and the second rotation point 154 is positioned at one end of the link unit 152 formed at the cover body unit 151. In addition, the connector (145 in FIG. 4) is positioned at an upper end portion of the connector hole 146.

Figure 6B:
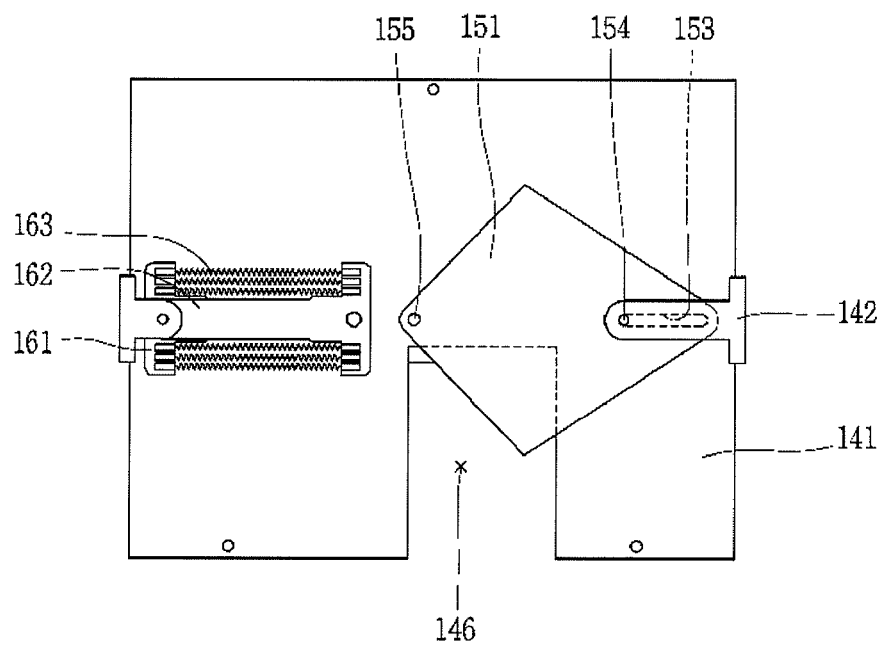

If the user applies force to the first body 110 or the second body 120 in the closed position, the first and second slide members 141 and 142 start to move relative each other into the configuration shown in FIG. 6B. As shown in FIG. 6B, the second slide member 142 is positioned at a central region of the first slide member 141. As the first and second rods 161 and 162 of the elasticity providing unit 160 are moved with respect to each other, the space between the other end of the first rod 161 and the other end of the second rod 162 increases. Accordingly, the spring 163 disposed between the first and second rods 161 and 162 is tensely deformed, and an elastic restoration force is generated at the spring 163 in the direction in which the spring 163 is to be compressed.

The second rotation point 154 is linearly moved along the hole 153 of the cover body unit 151 to apply a rotational force to the cover body unit 151 to allow the cover body unit 151 to be rotatably moved based on the first rotation point 155. The second rotation point 154 is linearly moved along the hole 153 as long as the distance to the first rotation point 155 is reduced. In the intermediate position, as shown in FIG. 6B, the second rotation point 154 is positioned at the other end of the link unit 153, and at this time, the distance between the first and second rotation points 154 and 155 is minimized.

As the first body 110 is moved from the closed position to the open position the first and second rods 161 and 162 are moved linearly in the direction in which they become close due to the elastic restoration force of the spring 163, and the first and second rods 161 and 162 applies force to move the first and second slide members 141 and 142 to assist in moving the first body 110 toward the open position. As a result, the first and second slide members 141 and 142 are relatively moved by the elastic restoration force of the spring 163 from the intermediate position into the open position, as shown in FIG. 6C.

Figure 6C:
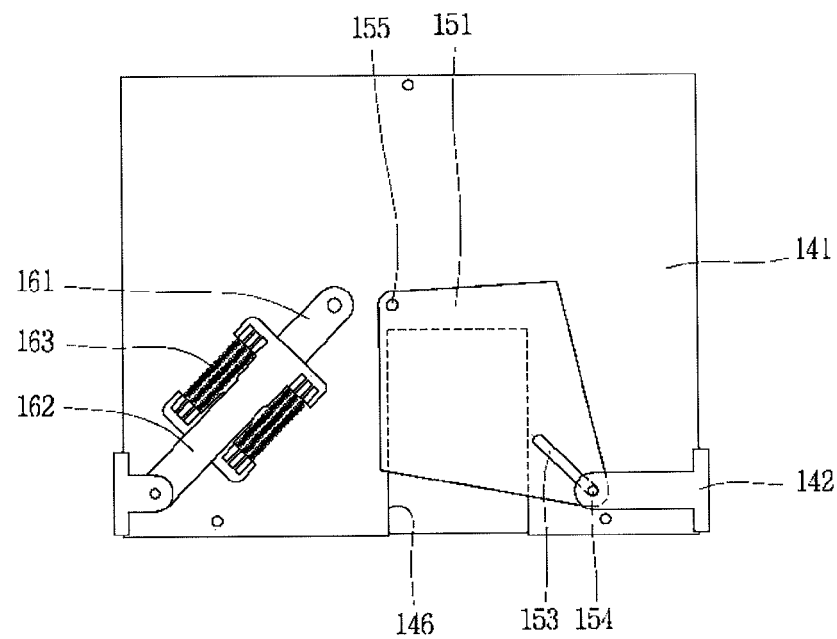

As shown in FIG. 6C, the second slide member 142 moves to a lower region of the first slide member 141, and the second rotation point 154 moves to one end in the hole 153. Accordingly, the cover body unit 151 covers the connector hole 146 to complete the rotational movement. The process of moving the first and second slide members 141 and 142 from the open position to the closed position may be performed in the reverse order of the above-described process.

Figure 7:
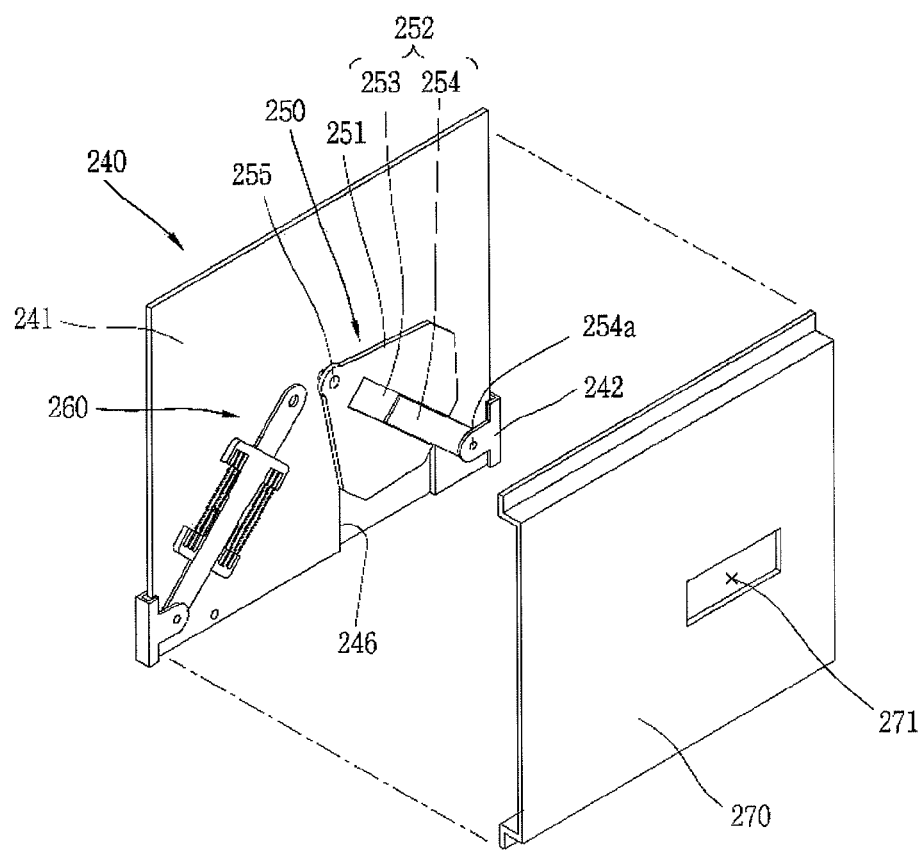
FIG. 7 is a perspective view of a slide module according to a second exemplary embodiment of the present invention.

FIG. 7 is a perspective view of a slide module 240 according to a second exemplary embodiment of the present invention. A cover unit 250 according to the second exemplary embodiment has the same construction as that of the cover unit 150 of the first exemplary embodiment of the present invention, except for the particulars of the link unit 252. Description for the same construction as that of the first exemplary embodiment will be omitted.

The cover unit 250 includes a cover body unit 251 rotatably connected to the first slide member 241 by means of a first rotation point 255 and a link unit 252 rotating the cover body unit 251 based on the first rotation point 255. The link unit 252 includes a rod groove 253 formed in the cover body unit 251 and a rod 254 rotatably connected to the second slide member 242 by first a second rotation point 254a. The rod groove 253 is formed on the cover body unit 251 such that it extends from the second rotation point 254a toward the first rotation point 255, and the rod 254 is coupled to the cover body unit 251 such that the rod 254 can be inserted in the rod groove 253 and linearly move therein.

Figure 8B:
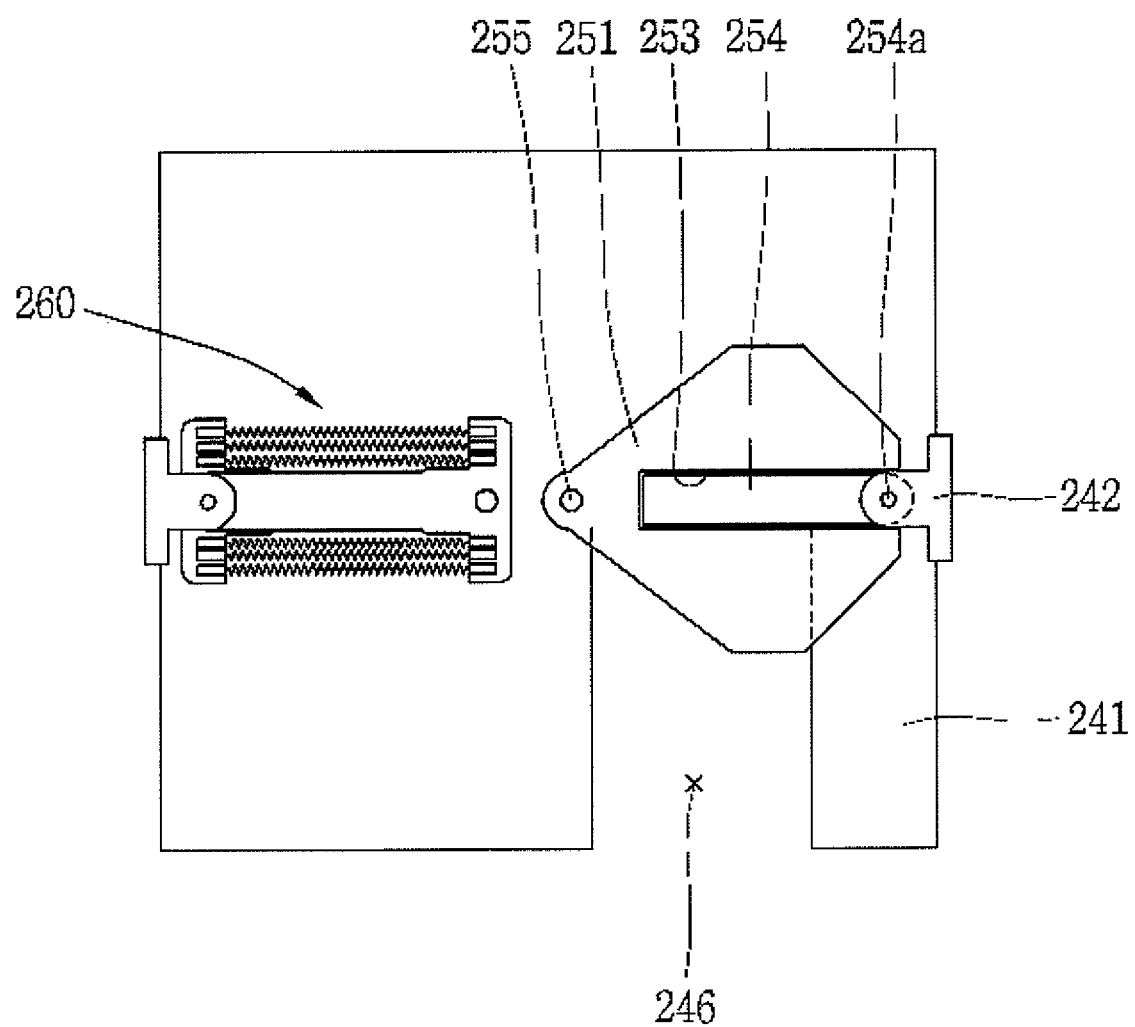

Having described the second exemplary embodiment of the slide module 240, movement of the components of the slide module 240 when the first body 110 is moved between the closed and open positions will be described with reference to FIGS. 8A to 8C. As shown in FIG. 8A, the second slide member 242 is positioned at an upper portion of the first slide member 241. When a user applies force to move the first body 110 from the closed position toward the open position, the second slide member 242 moves to a central region of the first slide member 241, as shown in FIG. 8B. Accordingly, the rod 254 moves linearly along the rod groove 253 toward the first rotation point 255 from the second rotation point 254a, and the rod 254 provides a rotary force to the cover body unit 251. In this manner, the distance between the first and second rotation points 254a and 255 is reduced, which corresponds to the movement distance of the rod 254. FIG. 8B shows the situation where the distance between the first and second rotation points 255 and 254a is minimized, which means that the rod 254 has been moved on the rod groove 253 the maximum amount.

Figure 8C:
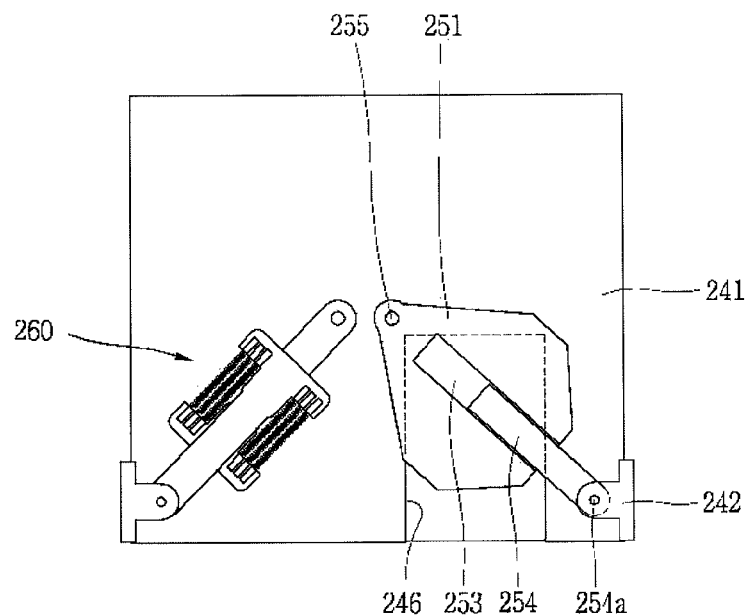

The second slide member 242 moves from the upper position, as shown in FIG. 8A, to the lower position, as shown in FIG. 8C, by the elastic restoration force of the elasticity providing unit 260. In this process, the rod 254 moves toward the second rotation point 254a from the first rotation point 255 to apply rotational force to the cover body unit 251, and accordingly, the cover body unit 251 is rotated to cover the connector hole 245.

Figure 9:
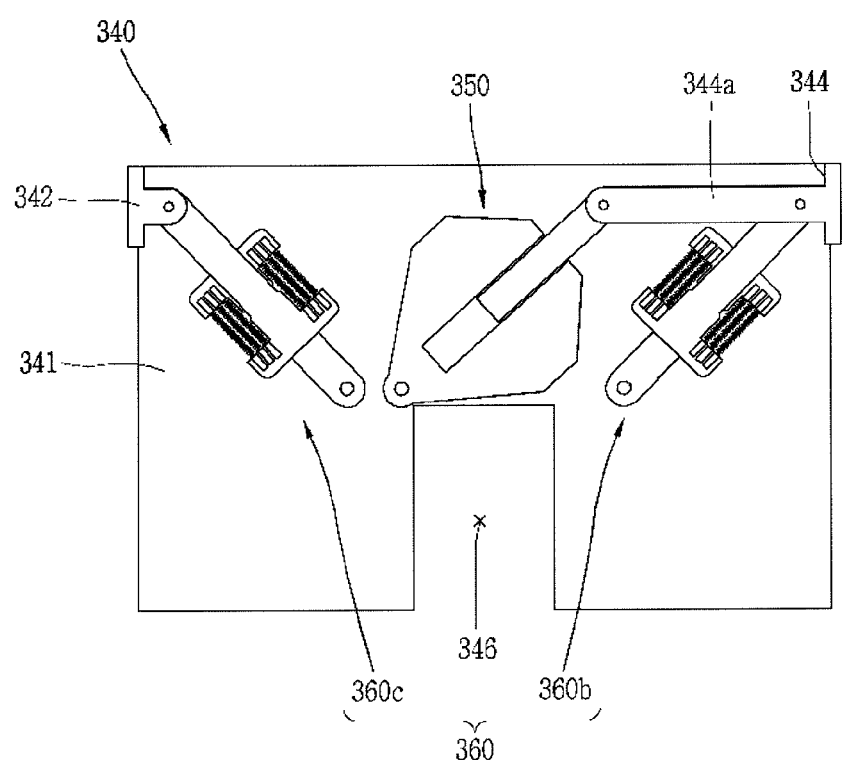
FIG. 9 is a front view of a slide module according to a third exemplary embodiment of the present invention.

FIG. 9 is a front view of a slide module 340 according to a third exemplary embodiment of the present invention. The slide module 340 according to the present invention has the same structure as the slide module 240 of the second exemplary embodiment, except for the particulars of the elasticity providing unit 360. In this exemplary embodiment, first and second elasticity providing units 360a and 360b are mounted at opposite sides of the first and second slide members 341 and 342. By providing two elasticity providing units, a stable elastic force is provided to the first and second slide members 341 and 342 when the first and second slide members 341 and 342 are moved with respect to each other.

The first elasticity providing unit 360a is mounted at one side of a central region of the first slide member 341 and the second elasticity providing unit 360b is mounted at the other side of the central region of the first slide member 341. An extending portion 344a is formed at one of the slide grooves 344 formed at the second slide member 342, the extending portion 344a extending toward the central region of the first slide member 341. A cover unit 350 is mounted at one side of the extending portion 344a, and the second elasticity providing unit 360b is mounted at the other side of the extending portion 344a.

The configuration and operation of the first and second elasticity providing units 360a and 360b and the cover unit 350 according to the third exemplary embodiment of the present invention is similar to those of the preceding exemplary embodiments, so description therefore will be omitted.

Figure 10:
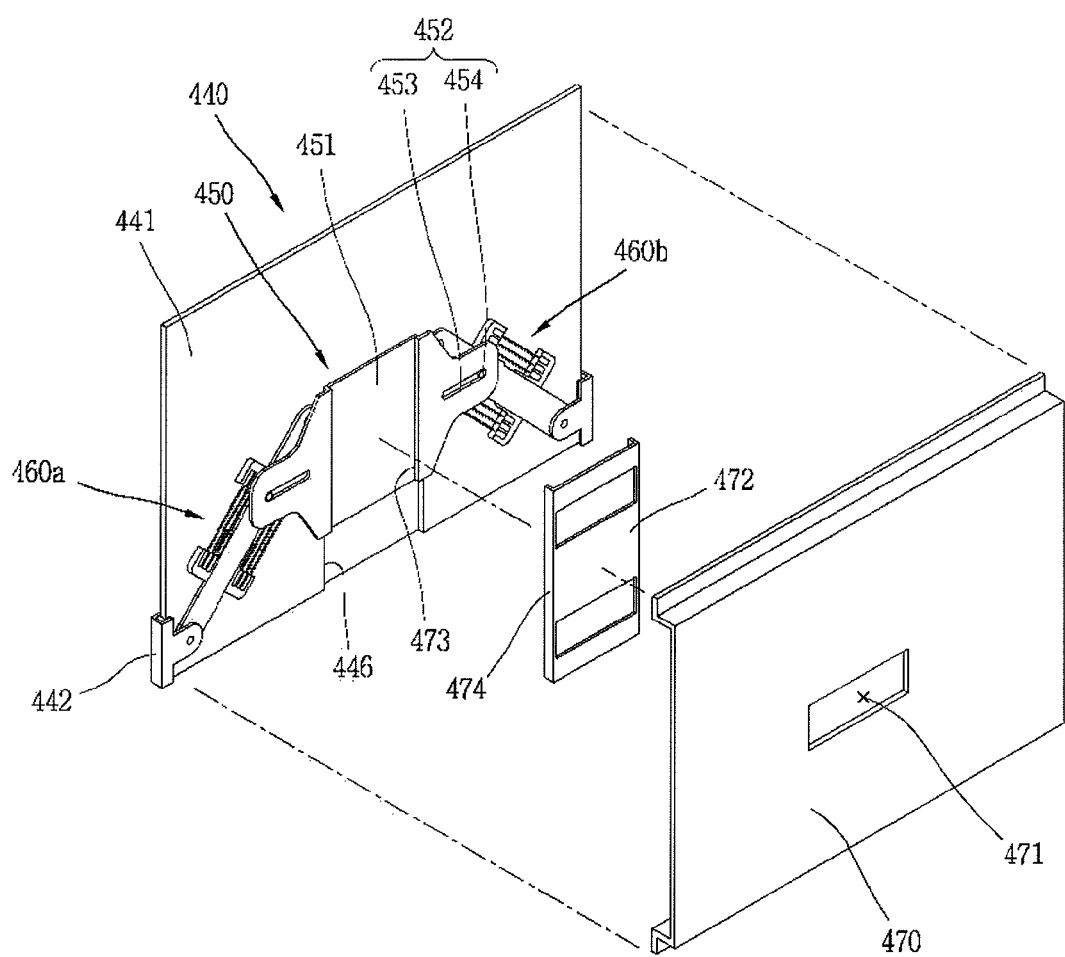
FIG. 10 is a perspective view of a slide module according to a fourth exemplary embodiment of the present invention.

FIG. 10 is a perspective view of a slide module 440 according to a fourth exemplary embodiment of the present invention. A cover unit 450 according to the fourth exemplary embodiment of the present invention includes a cover body unit 451 that moves on the first slide member 441 to cover or uncover a connector hole 446 and a link unit 452 for moving the cover body unit 451 by cooperating with one or more elasticity providing units. In particular, the cover body unit 451 is configured to linearly move on the first slide member 441 to cover or uncover the connector hole 446. The cover unit 450 according to this exemplary embodiment includes first and second elasticity providing units 460a and 460b disposed at opposite sides of the first and second slide members 441 and 442. Because the first and second elasticity providing units 460a and 460 have the same arrangement, only one will be described for the sake of explanation.

The link unit 452 includes a groove 453 formed on the cover body unit 451, and a protrusion 454 projecting from the second rod 462 and inserted in the groove 453. The groove 453 takes the form of a slit perpendicular to a relative movement direction of the first and second slide members 441 and 442, and the protrusion 454 is formed to be protruded from the second rod 462 to linearly move along the groove 453.

A movement preventing member 472 is provided to limit the cover body unit 451 from being moved in any other direction than the linear displacement provided by the link unit 452. The movement preventing member 472 is fixed on the cover member 470 to guide a slidable movement of the cover body unit 441. A movement preventing groove 473 is formed at a recess of a front surface of the cover body unit 441, and a movement preventing rail 474 may be formed at the side of the movement preventing member 472 and moved along the movement preventing groove 473. In FIG. 10, the movement preventing member 472 is formed separately from the cover member 470, but without being limited thereto, the movement preventing member 472 may be integrally formed with the cover member 470.

Figure 11A:
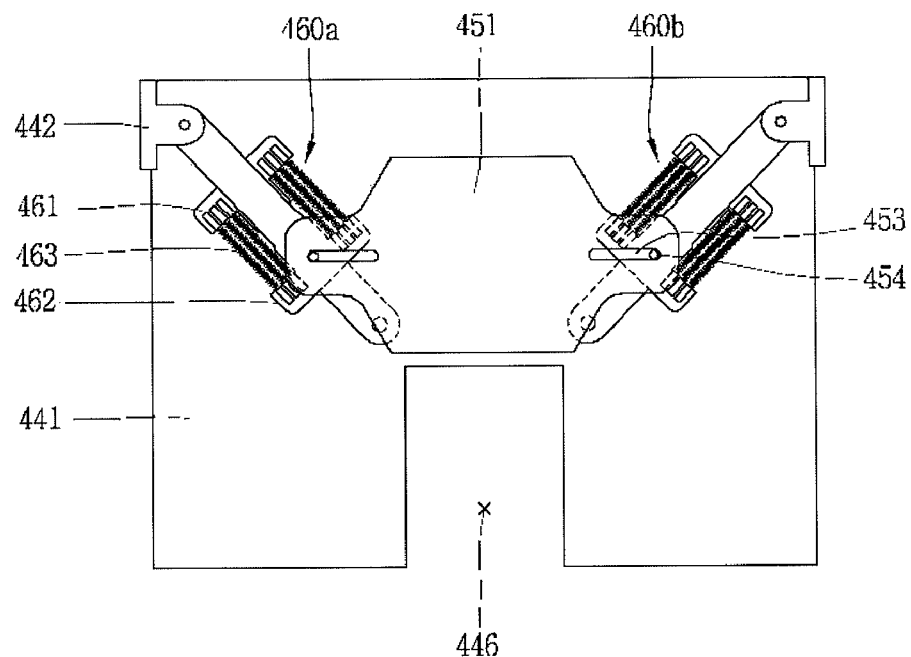
FIGS. 11A to 11C are front views of the slide module of FIG. 10.

Having described the fourth exemplary embodiment of the slide module 440, movement of the components of the slide module 440 when the first body 110 is moved between the closed and open positions will be described with reference to FIGS. 11A to 11C. As shown in FIG. 11A, the connector hole 446 is open when the first body 110 is in the closed position, and the cover body unit 451 is positioned at an upper end portion of the connector hole 446. The protrusion 454 of the elasticity providing unit 460a is positioned at one end of the groove 453.

Figure 11B:
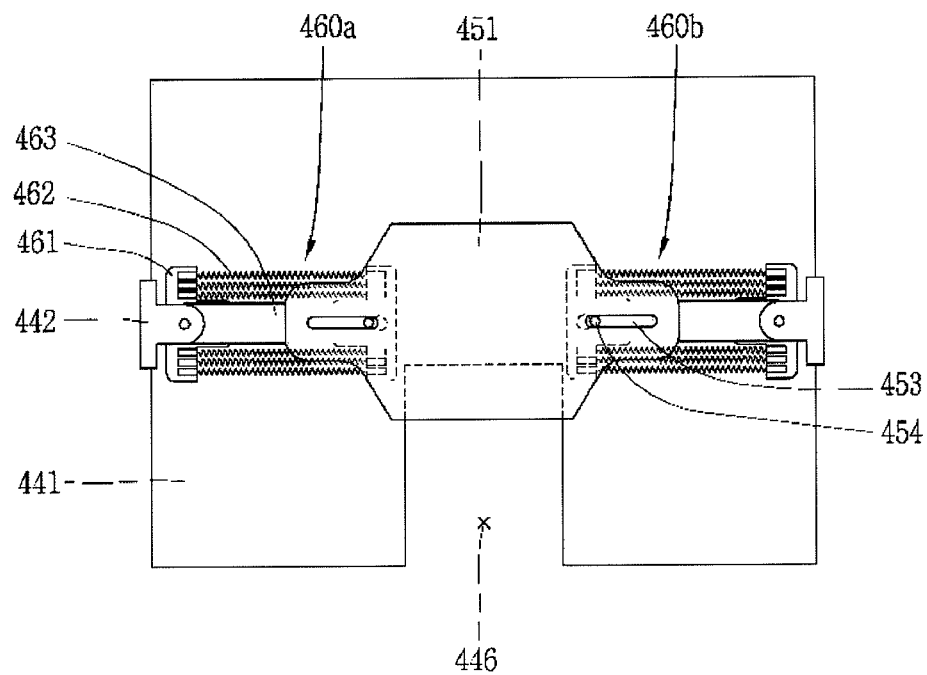

As the second slide member 442 is moved to the intermediate position, as shown in FIG. 11b, the first and second rods 461 and 462 of the elasticity providing unit 460a are moved relative to one another and the distance between the other ends of the first and second rods 461 and 462 is increased. Accordingly, the protrusion 454 moves linearly along the groove 453, and the protrusion 454 applies force to the cover body unit 451 in a downward direction to move the cover body unit 451 until the protrusion 454 is positioned at the other end of the groove 453.

Figure 11C:
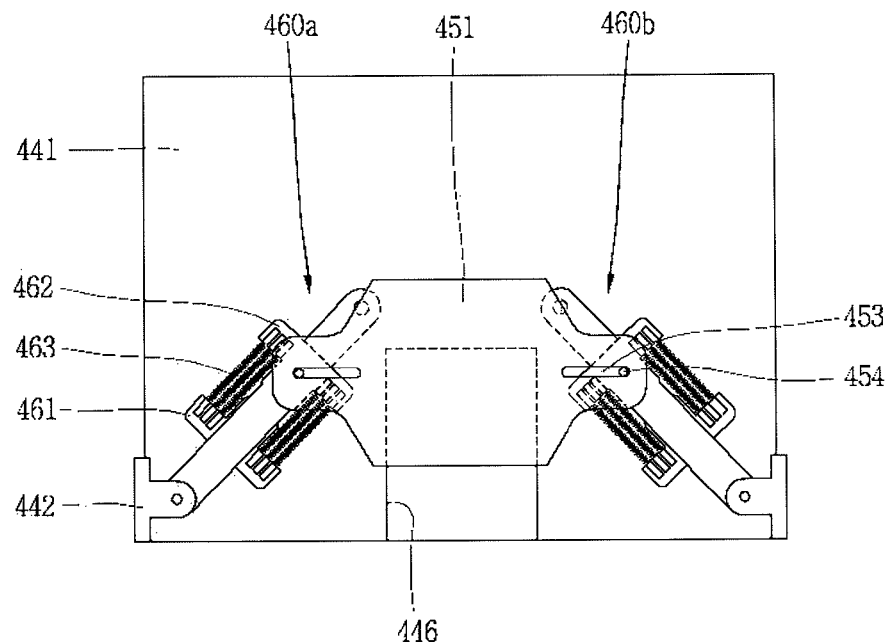

When second slide member 442 moves past the intermediate position, the first and second rods 461 and 462 are moved in a direction that the other ends of the first and second rods 461 and 462 are moved towards each other by the elastic restoration force, and accordingly, the second slide member 442 is moved to the position where the first body 110 is in the open position, as shown in FIG. 11C. Accordingly, the protrusion 454 is returned to the one end of the groove 453, and in the process, the protrusion 454 applies force to the cover body unit 451 to cause the cover body unit 451 to cover the connector hole 446.

Figure 12:
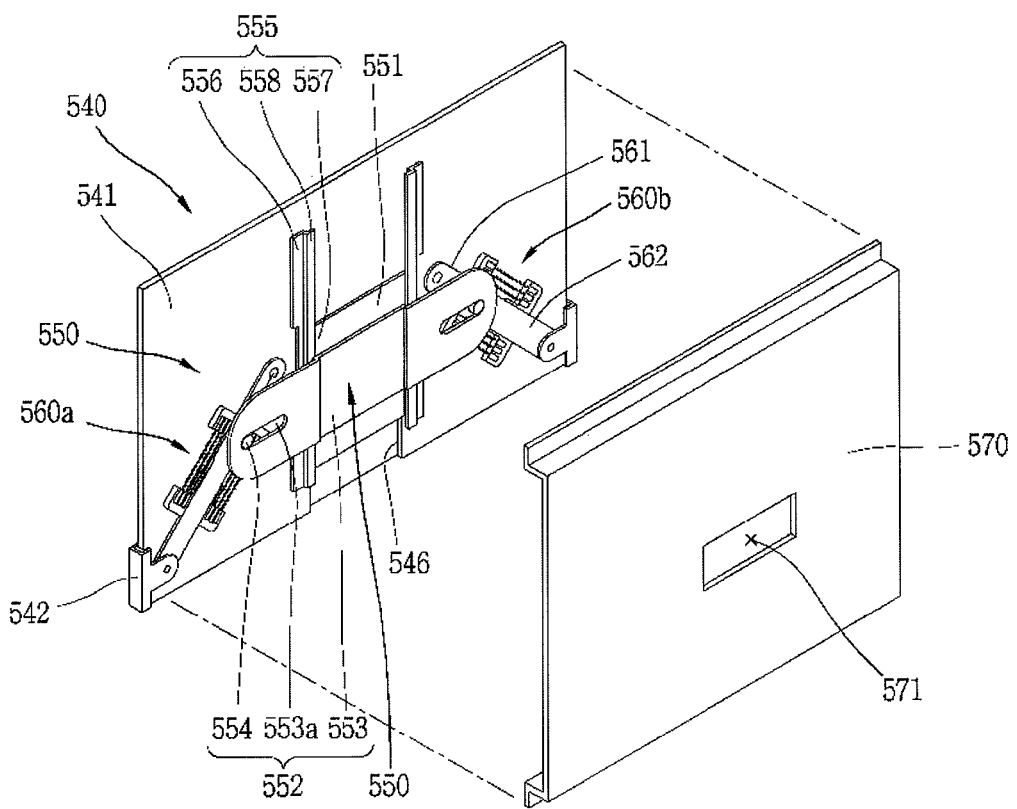
FIG. 12 is a perspective view of a slide module according to a fifth exemplary embodiment of the present invention.

FIG. 12 is a perspective view of a slide module 540 according to a fifth exemplary embodiment of the present invention. A cover unit 550 according to the fifth exemplary embodiment of the present invention has the same configuration as that of the cover unit 450 according to the fourth exemplary embodiment of the present invention, except for the particulars of a link unit 552, therefore a description for the same configuration will be omitted.

The link unit 552 includes a movement plate 553 disposed on one surface of the cover body unit 551 and a protrusion 554 formed on a second rod 562. The movement plate 553 is attached to a front surface of a cover body unit 551, and a groove 553a is formed in the movement plate 553. The groove 553a has a slit shape having a lengthwise direction perpendicular to a relative movement direction of the first and second slide members 541 and 542. In this exemplary embodiment, the movement plate 553 and the cover body unit 551 are separately formed, but without being limited thereto, the movement plate 553 and the cover body unit 551 may be integrally formed.

The protrusion 554 projects from the second rod 562 of the elasticity providing unit 560a so as to be inserted in the groove 553 and linearly moved therealong. The cover unit according to the fifth exemplary embodiment of the present invention may further include a guide unit 555 for guiding the movement of the cover body unit 551. The guide unit 555 includes a guide member 556 mounted on the first slide member 541 and a guide rail 557 formed at the side of the cover body unit 551. The guide member 556 includes a guide groove 558 extending in the movement direction of the cover body unit 551, and the guide rail 551 is inserted in the guide groove 558 and moved therealong.

Figure 13A:
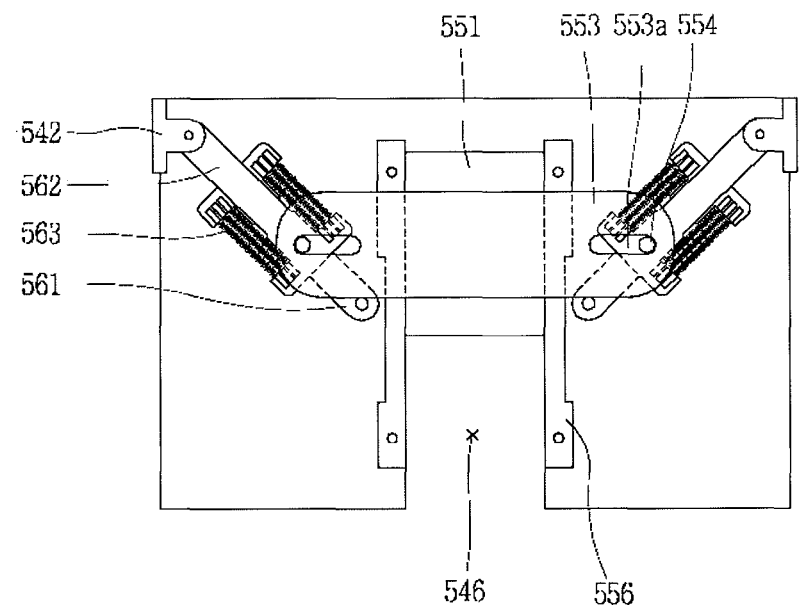
FIGS. 13A to 13C are front views of the slide module of FIG. 12.
Figure 13B:
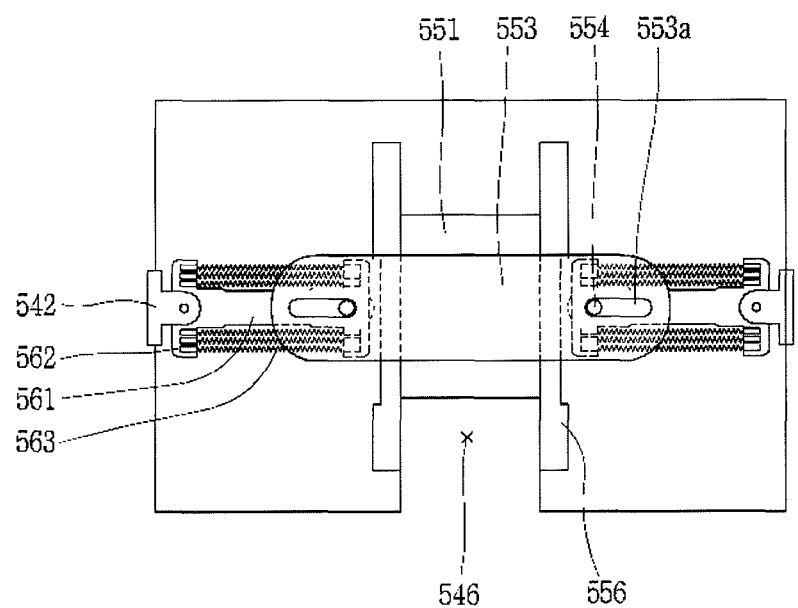
Figure 13C:
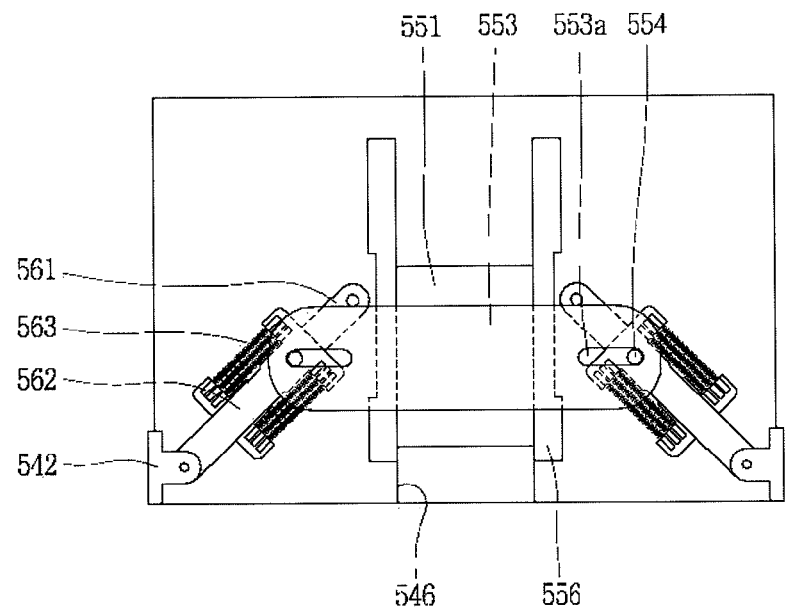

FIGS. 13A to 13C are front views of the slide module in FIG. 12, in which the first and second slide members 541 and 542 are relatively moved from the closed position to the open position. The process in which the protrusion 554 of the second rod 562 is moved along the groove 553a of the movement plate 553 is the same as the process in which the protrusion 454 of the second rod 462 is moved along the groove 453 of the cover body unit 451, therefore its description will be omitted. Furthermore, unlike the fourth exemplary embodiment of the present invention, the groove 553a is formed in the movement plate 553 and not on cover body unit 551. In this manner, the cover body unit 551 is stably moved along the guide member 556.

Figure 14:
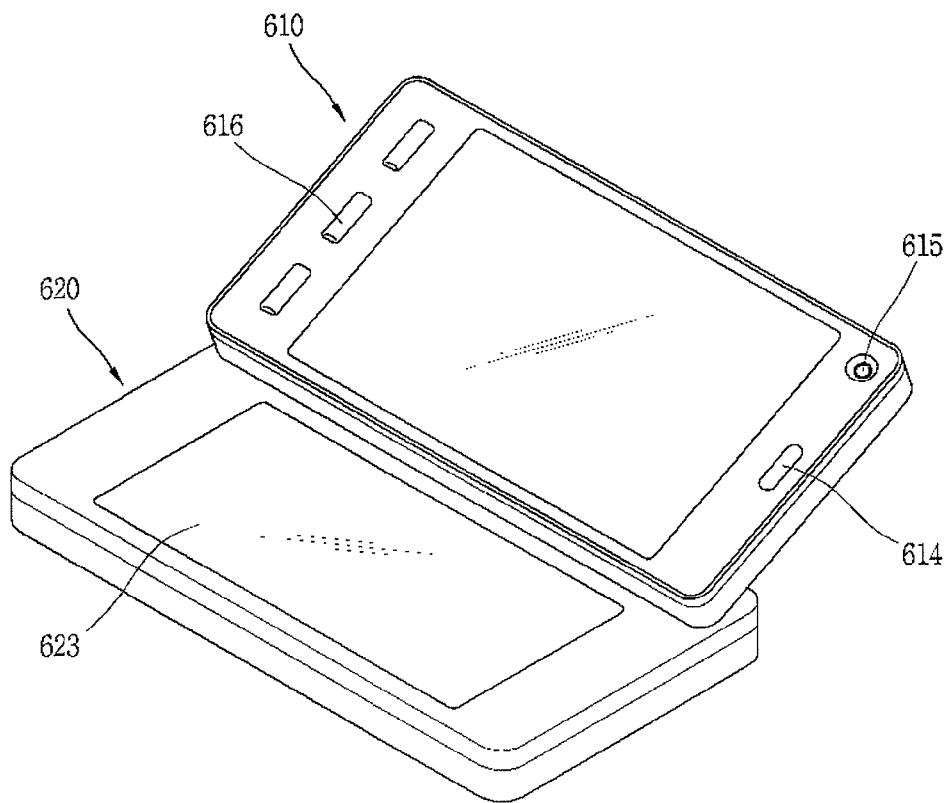
FIG. 14 is a perspective view of a mobile terminal with a slide module according to a sixth exemplary embodiment of the present invention.
Figure 15:
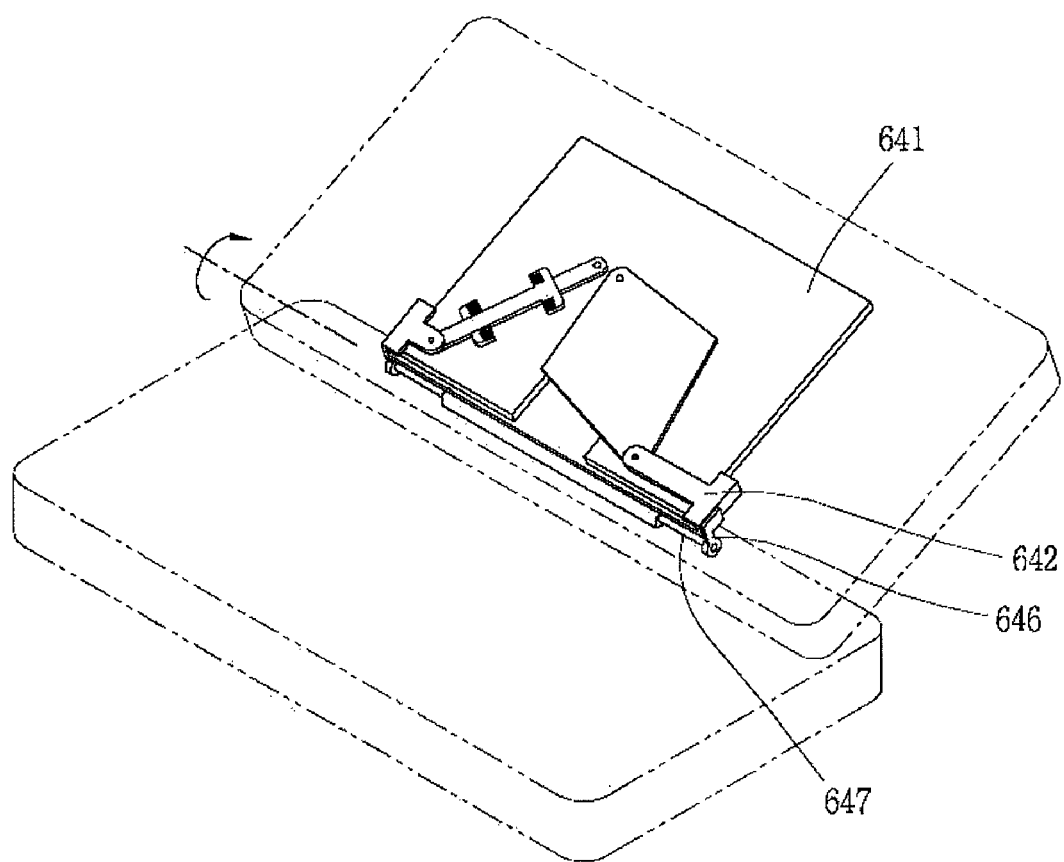
FIG. 15 is a perspective view of the mobile terminal of FIG. 14 with the first and second bodies shown in dashed lines.

FIG. 14 is a perspective view of a mobile terminal 600 with a slide module 640 according to a sixth exemplary embodiment of the present invention, and FIG. 15 is a perspective view of the mobile terminal of FIG. 14 with the first and second bodies shown in dashed lines. The slide module 641 according to the sixth exemplary embodiment of the present invention can be configured to be held at an angle with respect to the second body 620.

With reference to FIG. 15, an end portion of the second slide member 642 is connected to the second body 620 with a hinge connection unit 646. The hinge connection unit 646 includes a rotational shaft 647 provided on the second body 620, and the second slide member 642 may be rotated about the rotational shaft 647. With such a configuration, the first slide member 641 is moved on the second slide member 642 from the closed position to the open position, and then, the second slide member 642 is rotated at a certain angle with respect to the second body 620.

Accordingly, after the first body 610 is moved from the closed position to the open position, it can be positioned in a third configuration in which the first body 610 is stood at a certain angle with respect to the second body 620. When the user inputs information via a second display unit 623 of the second body 620 in the third configuration, the hinge connection unit 646 may allow the user to adjust the angle at which the first body 610 is positioned relative to the second body 620 depending upon how the user wishes to view the first display unit 613. In this exemplary embodiment of the mobile terminal 600, the hinge connection unit 646 can be applied to any of the foregoing slide modules described above.

Figure 16:
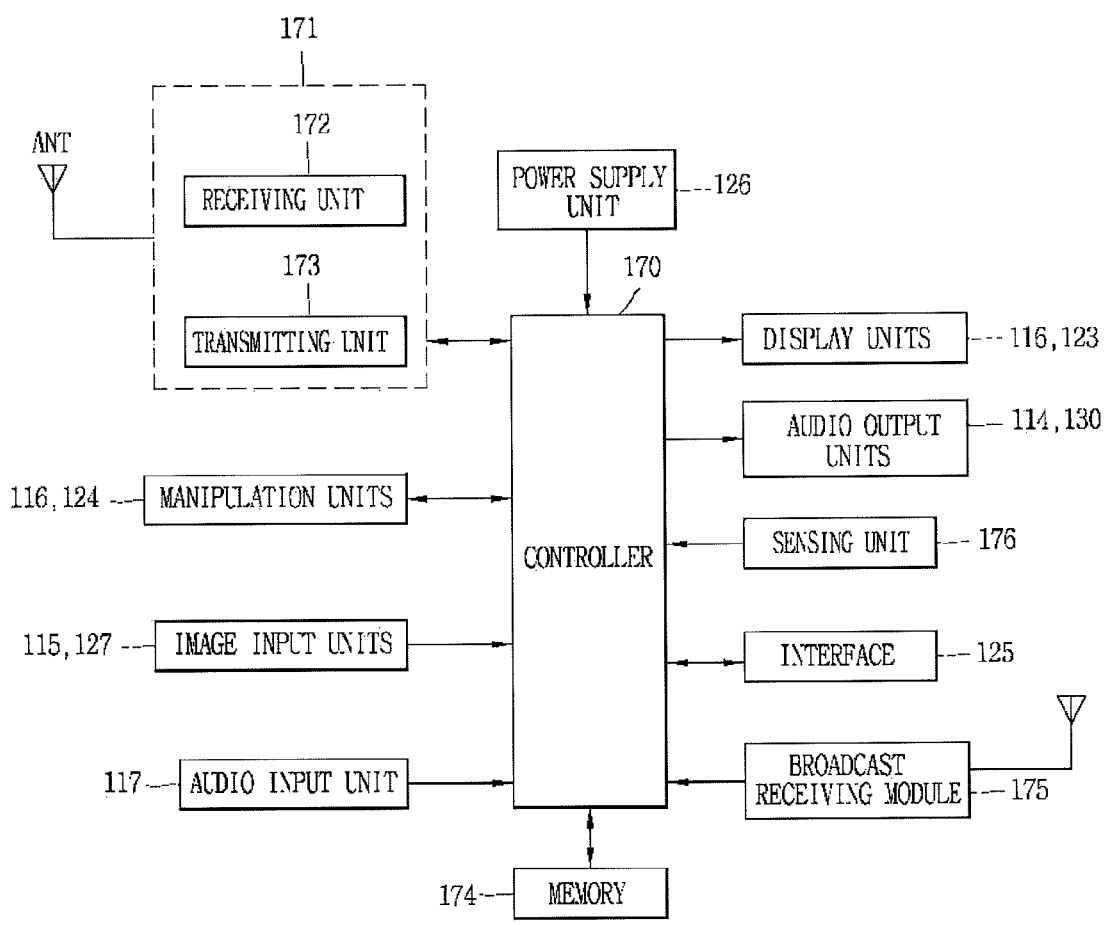
FIG. 16 is a schematic block diagram of a mobile terminal according to an exemplary embodiment of the present invention.

FIG. 16 is a schematic block diagram of a mobile terminal according to an exemplary embodiment of the present invention. With reference to FIG. 16, the mobile terminal according to the exemplary embodiment of the present invention includes a wireless communication module 171, manipulation units 116 and 124, image input units 115 and 127, an audio input unit 117, display units 116 and 123, audio output units 114 and 130, a sensing unit 176, an interface 125, a broadcast receiving module 175, a memory 174, a power supply unit 126, and a controller 170.

The controller 170 controls the general operation of the mobile terminal. For example, the controller 170 performs controlling and processing related to a voice call, data communication, a video call, or the like.

The wireless communication module 171 transmits/receives a radio signal to/from a mobile communication base station via an antenna. For example, the wireless communication module 171 includes a transmitting unit 173 that handles transmission/reception of voice data, character data, image data and control data, modulates a signal to be transmitted, and transmitting of the modulated signal. The wireless communication module 171 also includes a receiving unit 172 that demodulates a received signal, under the control of the controller 170.

The manipulation units 116 and 124 are configured as shown in FIG. 1, and provide key input data inputted to the controller 170 to control the operation of the mobile terminal by the user.

The image input units 115 and 127 may process image frames such as still images or video acquired by an image sensor in a video call mode or an image capture mode. The processed image frames may be converted into image data that can be displayed on the display units 116 and 123 and then outputted to the display unit 116 and 123. The image frames processed by the image input units 115 and 127 may be stored in the memory 174 or transmitted externally via the wireless communication module 171 under the control of the controller 170.

The audio input unit 117 may receive external audio signals via a microphone in a phone call mode, a recording mode, a voice recognition mode, or the like, and process the received audio signals into electrical voice data. In the phone call mode, the processed voice data is converted into a form that can be transmitted to a mobile communication base station via the wireless communication module 171, and then transmitted to the wireless communication module 171. In the recording mode, the processed voice data is outputted to be stored in the memory 174. The audio input unit 117 may include various types of noise canceling (or suppression) algorithms to cancel (or suppress) noise generated in the course of receiving and transmitting audio signals.

The display units 116 and 123 may output information processed in the mobile terminal. For example, when the mobile terminal 100 is in the phone call mode, the display units 116 and 123 may display a User Interface (UI) or a Graphic User Interface (GUI) associated with a call or other communication under the control of the controller 170. When the mobile terminal 100 is in the video call mode or the image capture mode, the display units 116 and 123 may display a captured image, a UI, a GUI, and the like, under the control of the controller 170. If the display units 116 and 123 are configured to have a touch screen, they may also be used as an input device.

The audio output units 114 and 130 may convert audio data received from the wireless communication module 171 or stored in the memory 174 and output the converted data in a call signal reception mode, a phone call mode, a recording mode, a voice recognition mode, a broadcast reception mode, and the like, under the control of the controller 170. Also, the audio output units 114 and 130 may provide audible outputs related to a particular function (e.g., a call signal reception sound, a message reception sound, etc.) performed by the mobile terminal.

The sensing unit 176 detects a current status (or state) of the mobile terminal such as an open/close state of the mobile terminal, a location of the mobile terminal, presence or absence of user contact with the mobile terminal, etc., and generates a sense (control) signal for controlling the operation of the mobile terminal. For example, when the mobile terminal is a slide phone, opening/closing of the slide phone is sensed and the sensing results are outputted to the controller 170 to control the operation of the terminal. In addition, the sensing unit 176 can perform a sensing function as to whether or not the power supply unit 128 supplies power or whether or not the interface 125 is coupled with an external device.

The interface 125 may serve as an interface with at least one external device connected with the mobile terminal. For example, the external devices may include wired/wireless headsets, external power chargers, wired/wireless data ports, card sockets (e.g., for receiving a memory card, a SIM/UIM card, etc.), and the like. The interface 125 may be used to receive inputs (e.g., data, information, power, etc.) from an external device and transfer the received inputs to one or more elements within the mobile terminal, or may be used to transfer data from the mobile terminal to another external device.

The memory 174 may store programs or the like used for the processing and controlling performed by the controller 170, or may temporarily store inputted/outputted data (e.g., a phonebook, messages, still images, video, etc.). Also, the memory 174 stores a program that controls the operations of the mobile terminal 100 according to the present invention. The memory 174 may include at least one type of storage medium including a hard disk type, a card-type memory (e.g., SD or XD memory, etc), a flash memory, a Random Access Memory (RAM), a Read-Only Memory (ROM), and the like.

The broadcast receiving module 175 may receive a broadcast signal transmitted through a satellite or terrestrial means, convert the same into a broadcast data format that can be outputted to the audio output units 114 and 130 and the display units 116 and 123, and output the converted data to the controller 170. In addition, the broadcast receiving module 175 may receive supplementary data (e.g., Electronic Program Guide (EPG), a channel list, etc.) associated with a broadcast. The broadcast data and supplementary data converted by the broadcast receiving module 175 may be stored in the memory 174.

The power supply unit 126 is provided with internal or external power and supplies power required for operations of the elements under the control of the controller 170.

As so far described, the slide module and the mobile terminal having the same according to the present invention have several advantages. First, because the cover unit is provided to open and close the connector hole according to the relative movement of the first and second slide modules, the relative movement distance of the first and second bodies can be increased without affecting the fine view of the mobile terminal.

Second, because the elasticity providing unit for applying elastic force to the first and second slide members is disposed between the first slide member and the first body, the elasticity providing unit is not exposed in the open position.

Third, because the first and second display units are provided at the first and second bodies to allow inputting of information by touching visual information, more convenience interface environment can be provided to users.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
    a first body;
    a second body slidably moveable with respect to the first body such that the first body is moved between a closed position and an open position;
    a connector electrically connecting the first body to the second body; and
    a slide module connecting the first body to the second body to allow the second body to move with respect to the first body between the closed position and the open position, the slide module including:
    a first slide member fixed to the first body, the first slide member having a connector hole to receive a portion of the connector when the first body is in the closed position;
    a second slide member fixed to the second body, the second slide member being slidably coupled to the first slide member;
    a cover unit covering the connector when the first body is in the open position to prevent exposure of the connector to an exterior of the mobile terminal; and
    a first elasticity providing unit to apply elastic force to assist in moving the first body between the closed and open positions according to the relative movement of the first and second slide members,
    wherein the first elasticity providing unit is separate from the cover unit.

2. The mobile terminal of claim 1, wherein the cover unit includes:
    a cover body unit rotatably connected to the first slide member by a first rotation point, the cover body unit being configured to cover and uncover the connector hole; and
    a link unit connecting the cover body unit one of the first and second slide members, the link unit being configured to rotate the cover body unit around the first rotation point according to relative movement of the first and second slide members.

3. The mobile terminal of claim 2, wherein the link unit causes the cover body unit to cover the connector hole when the first body is moved from the closed position to the open position and causes the cover body unit to uncover the connector hole when the first body is moved from the open position to the closed position.

4. The mobile terminal of claim 2, wherein the link unit includes:
    a groove formed in the cover body unit; and
    a second rotation point rotatably connecting the cover body unit to the second slide member, the second rotation point being movable along the groove during relative movement of the first and second slide members.

5. The mobile terminal of claim 4, wherein the groove is linear and the second rotation point moves linearly along the groove during relative movement of the first and second slide members.

6. The mobile terminal of claim 2, wherein the link unit includes:
    a groove formed in the cover body unit; and
    a rod connected to the second slide member at a second rotation point, the rod being linearly moveable along the groove during relative movement of the first and second slide members.

7. The mobile terminal of claim 1, wherein the cover unit and the first elasticity providing unit are positioned between the first body and the first slide member.

8. The mobile terminal of claim 1, wherein the first slide member includes a slide rail formed at an edge thereof,
    the second slide member includes a slide groove formed at an edge thereof, the slide groove extending toward the first body to cover the slide rail, and
    the first elasticity providing unit is disposed to connect an inner surface of the slide groove and a front surface of the first slide member adjacent the first body.

9. The mobile terminal of claim 7, wherein the cover unit and the first elasticity providing unit are mounted at opposite sides of the first slide member on the front surface thereof.

10. A mobile terminal comprising:
    a first body;
    a second body slidably moveable with respect to the first body such that the first body is moved between a closed position and an open position;
    a connector electrically connecting the first body to the second body; and
    a slide module connecting the first body to the second body to allow the second body to move with respect to the first body between the closed position and the open position, the slide module including:
    a cover unit to prevent exposure of the connector when the first body is in the open position;
    a first slide member fixed to the first body, the first slide member having a connector hole to receive a portion of the connector when the first body is in the closed position;
    a second slide member fixed to the second body, the second slide member being slidably coupled to the first slide member;
    a first elasticity providing unit to apply elastic force to assist in moving the first body between the closed and open positions according to the relative movement of the first and second slide members; and a second elasticity providing unit,
wherein the cover unit is mounted at a central portion of the first slide member, and
the first and second elasticity providing units are mounted at opposite sides of the first slide member on the front surface thereof.

11. The mobile terminal of claim 7, wherein the first slide member further includes a cover member that covers the cover unit and the elasticity providing unit, the cover member connecting the first slide member to the first body.

12. The mobile terminal of claim 1, wherein
the cover unit includes:
 a cover body unit connected to the first elasticity providing unit such that the cover body unit moves linearly on the first slide member to cover and uncover the connector hole; and
 a link unit connecting the cover body unit to the first elasticity providing unit, the link unit cooperating with the first elasticity providing unit to move the cover body unit linearly during relative movement of the first and second slide members.

13. The mobile terminal of claim 12, wherein the first elasticity providing unit includes:
 a first rod having first and second ends, the first end being rotatably connected to the first slide member;
 a second rod having first and second ends, the first end being rotatably connected to the second slide member, the second rod being mounted on the first rod such that the second rod is linearly movable; and
 a spring mounted between the second end of the first rod and the second end of the second rod to generate elastic force between the first and second rods.

14. The mobile terminal of claim 13, wherein the link unit includes:
 a first groove formed on the cover body unit; and
 a first protrusion projecting from one surface of one of the first and second rods, the first protrusion being movable along the groove during relative movement of the first and second slide members.

15. The mobile terminal of claim 14, wherein the groove is linear and the protrusion moves linearly along the groove during relative movement of the first and second slide members.

16. The mobile terminal of claim 14, wherein the slide module includes a second elasticity providing unit, and the link unit includes:
 a second groove formed on the cover body unit; and
 a second protrusion projecting from one surface of the second elasticity providing unit, the second protrusion being moveable along the groove during relative movement of the first and second slide members.

17. The mobile terminal of claim 14, wherein the slide module further includes a movement preventing member that is configured to limit movement of the cover body unit in any other direction than the linear displacement provided by the link unit and the first elasticity providing unit.

18. The mobile terminal of claim 13, wherein the link unit includes:
 a plate disposed on one surface of the cover body unit, the plate having a groove; and
 a protrusion projecting from one surface of one of the first and second rods, the protrusion being movable along the groove during relative movement of the first and second slide members.

19. The mobile terminal of claim 18, wherein the cover unit further includes a guide unit to guide the movement of the cover body unit, the guide unit including:

a guide member mounted on the first slide member, the guide member having a guide groove; and
a guide rail formed at a side of the cover body unit, the guide rail being inserted in the guide groove so as to be moveable in the guide groove.

20. The mobile terminal of claim 1, wherein the slide module further includes a hinge connection unit configured to position the first body at a certain angle greater that 0° with respect to the second body.

21. The mobile terminal of claim 1, wherein at least a portion of the second body is exposed when the first body is in the open position and said at least a portion of the second body is covered when the first body is in the closed position.

22. The mobile terminal of claim 1, wherein the connector includes a flexible printed circuit board that is deformed during relative movement of the first and second bodies.

23. The mobile terminal of claim 1, wherein the first body includes a first display, the second body includes a second display, and the first and second display units are configured to receive user inputs via touching of displayed information.

24. A slide module for a mobile terminal having a first body, a second body slidably connected to the first body such that the first body is moveable between a closed position and an open position, and a connector electrically connecting the first body to the second body, the slide module comprising:
 a first slide member connectable to the first body, the first slide member having a connector hole capable of receiving a portion of the connector when the first body is in the closed position;
 a second slide member connectable to the second body, the first slide member being slidably connected to the second slide member to allow the first and second bodies to move between the closed and open position;
 an elasticity providing unit to apply elastic force to assist in moving the first body between the closed and open positions according to the relative movement of the first and second slide members; and
 a cover unit configured to prevent exposure of the connector when the first body is in the open position, the cover unit including:
  a cover body unit connected to the elasticity providing unit such that the cover body unit moves linearly on the first slide member to cover and uncover the connector hole; and
  a link unit connecting the cover body unit to the elasticity providing unit, the link unit cooperating with the elasticity providing unit to move the cover body unit linearly during relative movement of the first and second slide members.

25. The slide module of claim 24, wherein the elasticity providing unit is locatable between the first body and the first slide member.

26. A mobile terminal comprising:
 a first body;
 a second body slidably moveable laterally with respect to the first body such that the first body is moved between a closed position and an open position;
 a connector electrically connecting the first body to the second body; and
 a slide module connecting the first body to the second body to allow the second body to move with respect to the first body between the closed position and the open position, the slide module including:
  a connector hole to receive a portion of the connector, the connector hole being exposed to an exterior of the mobile terminal when the first body is in the open position; and a cover unit configured to cover the opening to prevent exposure of the connector to the exterior of the mobile terminal when the first body is in the open position.

27. The mobile terminal of claim 26, wherein the slide module further includes:
   a first slide member fixed to the first body, the first slide member having the connector hole; and
   a second slide member fixed to the second body, the second slide member being slidably coupled to the first slide member.

28. The mobile terminal of claim 27, wherein the cover unit includes:
   a cover body unit rotatably connected to the first slide member by a first rotation point, the cover body unit being configured to cover and uncover the connector hole; and
   a link unit connecting the cover body unit one of the first and second slide members, the link unit being configured to rotate the cover body unit around the first rotation point according to relative movement of the first and second slide members.

29. The mobile terminal of claim 27, wherein the slide module further includes a first elasticity providing unit to apply elastic force to assist in moving the first body between the closed and open positions according to the relative movement of the first and second slide members, and
   the cover unit includes:
      a cover body unit connected to the first elasticity providing unit such that the cover body unit moves linearly on the first slide member to cover and uncover the connector hole; and
      a link unit connecting the cover body unit to the first elasticity providing unit, the link unit cooperating with the first elasticity providing unit to move the cover body unit linearly during relative movement of the first and second slide members.

30. The mobile terminal of claim 26, wherein the cover unit includes a plate member to cover the connector hole.

* * * * *